Dec. 10, 1935.  A. E. SEHLBACH  2,023,703
COMBINED SUNDAE AND SODA RECEPTACLE
Filed June 14, 1935
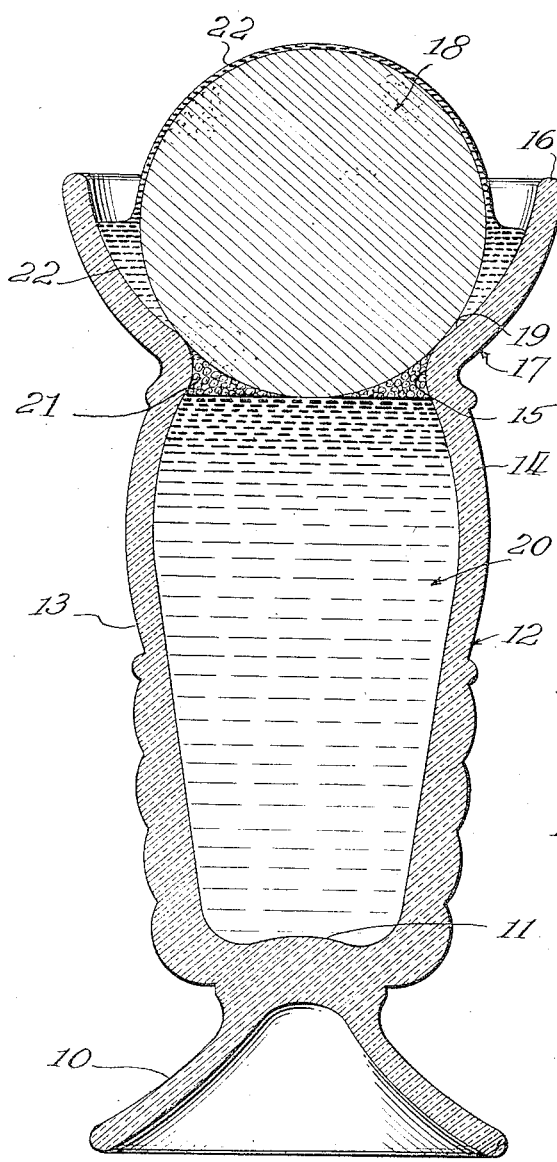
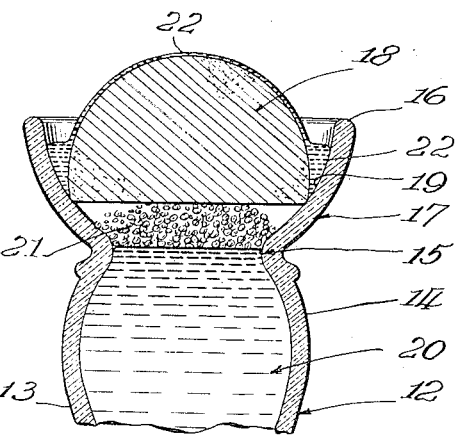
Inventor:
Albert E. Sehlbach
By Williams, Bradbury, McCaleb & Hinkle
Attys.

Patented Dec. 10, 1935

2,023,703

UNITED STATES PATENT OFFICE 2,023,703

COMBINED SUNDAE AND SODA RECEPTACLE

Albert E. Sehlbach, Chicago, Ill., assignor to Albert Pick Co., Inc., Chicago, Ill., a corporation of Delaware Application June 14, 1935, Serial No. 26,592

1 Claim. (Cl. 65—15)

The present invention provides a container which I have chosen to designate as a combined sundae and soda receptacle, for the reason that one of its salient purposes is to facilitate the preparation, service and consumption of a novel confection having the characteristics of both an ice cream sundae and an ice cream soda. The receptacle, however, affords important advantages in the preparation, service and consumption of plain ice cream sodas and other soda fountain products comprising appropriate liquids in combination with semi-solids such as ice cream, sherbets and water ices.

While the receptacle is preferably formed of glass, it may be fashioned from a variety of other suitable materials.

One of the objects of the invention, as before indicated, is to provide a receptacle which facilitates the preparation, service and consumption of a novel confection in which is combined the characteristics of a sundae and a soda.

Another object of the invention is to provide a vertically elongated receptacle which, at its open upper portion, will support a serving of ice cream against shifting and bobbing in an underlying column of liquid such as appropriately flavored soda water. In the use of conventional soda glasses, the serving of ice cream usually floats adjacent the top or free surface of the liquid. The consumer, in such cases, is considerably hampered by the tendency of the ice cream to shift, bob about and elude a spoon which is not skillfully manipulated in such manner as to press the ice cream against the side wall of the glass as the spoon is filled. The receptacle of the present invention eliminates this difficulty by stably supporting a serving of ice cream until it has been consumed down to such size that it appropriately submerges and loses its identity in, and cools, the underlying column of liquid.

Other features, objects and advantages of my invention will appear from the progress of the following description, wherein reference is made to the accompanying sheet of drawings, in which Fig. 1 is a vertical sectional view of the receptacle of the present invention as it appears when containing a combined sundae and soda,—the serving of ice cream and the liquids constituting such confection also being shown in section;

Fig. 2 is a fragmentary sectional view of the container and its contents as they appear when the serving of ice cream is of the now popular semi-spherical shape as distinguished from the spherical shape exhibited in Fig. 1; and Fig. 3 is a view similar to Fig. 2, but exhibiting a receptacle characterized by a pronounced constriction for supporting and confining the components of the sundae in its upper portion.

Similar characters of reference refer to similar elements throughout the several views.

Referring to the drawing, and more particularly to Fig. 1, the receptacle of my invention is preferably, but not necessarily, formed of glass, as indicated. It may comprise the conical base 10 integrally joined to the bottom 11 of the vertically elongated body portion 12. The base 10 may be omitted if other means, either carried with or separate from body portion 12, be provided to support the said body portion in its upright position.

The body portion 12 may take various ornamental shapes, but desirably includes the bottom 11 and the circular side wall 13 which may be formed either with or without an outward curvature or bulge. In the illustrated embodiments of the invention, the body portion 12 tapers toward its bottom and is of such capacity that it will hold the conventional quantity of ice cream soda liquid.

Also, in the illustrated embodiments of the invention, the body portion 12 is curved inwardly at 14, to define a constriction or throat 15 which is only slightly spaced from the top edge 16 of the receptacle. Between the constriction 15 and top edge 16 the side wall of the receptacle flares outwardly to define the open top bowl, dish or hopper 17, which, while communicating with body portion 12 through constriction or throat 15, is adapted to receive and stably support a conventionally measured serving of ice cream, depicted at 18.

The serving of ice cream 18 may be of any of the standard shapes, of which only the spherical and semi-spherical have been illustrated. The semi-spherical shape of the ice cream serving is usually attained by moving a semi-spherical dipper through a supply of ice cream until the dipper is full and then scraping the open face of the dipper across the edge of the ice cream container to remove the excess of ice cream. The substantially spherical shape of the ice cream serving may be attained by inserting the conventional semi-spherical dipper into a body of sufficiently hard ice cream, and then turning the dipper about the axis of its handle. It will be understood, however, that the receptacle of the present invention is not limited in its use to any particular shape for the lump or serving of ice cream received and stably supported by its bowl or dish portion 17. For example, the old style conical serving of ice cream may be placed in and be stably supported by the bowl or dish portion 17 of the receptacle.

The upwardly and outwardly flaring wall of the bowl or dish 17 provides a more or less conical surface or seat 19 upon which the serving of ice cream 18 may be stably supported in such manner that a spoon may dig into it without causing any shifting or bobbing movement of the ice cream in the receptacle. Until the size of the ice cream serving is substantially reduced it constitutes, in effect, an edible valve mechanically cooperating with the conical surface or seat 19 to prevent the downward passage of liquid through the constriction or throat 15. This is a feature of great advantage and importance in the preparation, service and consumption of the combined sundae and soda depicted in the drawing.

In the drawing the carbonated liquid portion of the beverage or confection, which is first placed in the receptacle, is indicated at 20.

In preparing the combined sundae and soda the order of placing the several ingredients into the receptacle is conveniently as follows:

The sirup which is employed to flavor the soda or carbonated water is first placed in the body portion 12 of the receptacle. Then the body portion 12 of the receptacle is given the usual heavy and fine shots of carbonated water to fill the said body portion substantially up to the constriction or throat 15. The attendant bubbles are indicated at 21. The ice cream 18 is next placed upon the seat 19 of the bowl or dish portion 17. The sirup or other fluid component of the sundae, indicated at 22, is finally poured over the ice cream, but is retained in the bowl or dish portion of the receptacle by reason of the valve like cooperation of the ice cream 18 with the seat 19.

Thus during the preparation, service and first part of the consumption of the new confection, I definitely separate, and hold separated, the sundae (composed of ice cream 18 and the sirup or other fluid ingredient 22) and the liquid 20 (composed of the carbonated water and its intermixed flavoring sirup). However, when the sundae has been substantially consumed, the remaining ice cream drops through the constriction or throat 15 to convert the carbonated liquid 20 into an ice cream soda,—a very appropriate and pleasing "wash down" or "chaser" for a sundae.

The precise degree to which the receptacle is choked by the constriction 15 is not critical, as will be apprehended by a comparison of Figs. 1 and 3. However, the designer of the receptacle, in determining the degree to which it is choked by the constriction 15, should bear in mind the following considerations: Firstly, the constriction should be sufficiently pronounced to insure stable support of the ice cream in the upper portion of the receptacle, and to permit the ice cream to perform its valve like function when the combined sundae and soda is prepared. Secondly, the constriction should not be so pronounced as unduly to hamper the easy and thorough washing of the interior of the body portion 12 of the receptacle. Thirdly, the constriction should pass the bowl of the conventional soda spoon. Fourthly, the greater the degree of the constriction, the greater the degree to which the stably supported serving of ice cream may be consumed before merging with the liquid which lies beneath the constriction.

In preparing a plain ice cream soda in the receptacle of the present invention, the level of the liquid 20 is usually somewhat higher than is the case in the preparation of the combined sundae and soda, and the sundae sirup or sauce 22 is, of course, omitted.

Having thus illustrated and described my invention, what I claim is new and desire to secure by Letters Patent of the United States is:

In a service of soda fountain products, the combination of a vertically elongated receptacle comprising at its upper end a relatively shallow open top bowl in which a serving of ice cream is received, said open top bowl directly communicating with the lower part of the receptacle through a throat which is defined by an inwardly projecting rib and which is substantially constricted in relation to the top opening of the bowl to support the serving of ice cream until its size has been materially reduced by the consumer, said throat being also constricted in relation to the upper part of the receptacle underlying it, in which lower part of the receptacle a beverage may be contained, whereupon when the serving of ice cream has been reduced in size sufficient to pass downwardly through the throat, it may merge with and cool the beverage beneath.

ALBERT E. SEHLBACH.